3,326,940
DERIVATIVES OF BICYCLOHEPTANE KETONES AND METHOD FOR PREPARING SAME
Morris Dunkel, Paramus, N.J., assignor to Universal Oil Products Company, Des Plaines, Ill., a corporation of Delaware
No Drawing. Filed Apr. 25, 1966, Ser. No. 544,822
9 Claims. (Cl. 260—346.3)

This invention relates to new polycarboxylic compounds and to a method for preparing them. More particularly, this invention is directed to a new class of tetracarboxylic bicycloheptane ketones and to a method of preparation therefor.

Polycarboxylic compounds are widely used chemicals having unique utility as components of such valuable materials as polyesters, epoxy curing agents, polyamic-acids or polyimides. An object of this invention, therefore, is to provide a new class of polycarboxylic compounds having such valuable utility. Another object of this invention is to provide a novel class of tetracarboxylic bicycloheptane ketones and a method for their preparation.

The tetracarboxylic bicycloheptane ketones of this invention have the following general formulae:

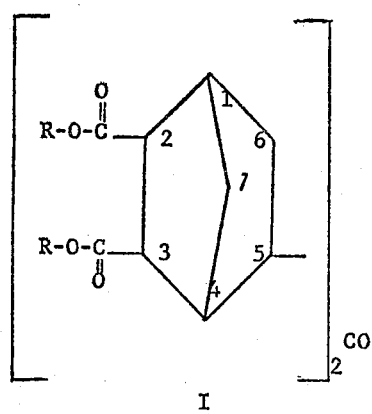

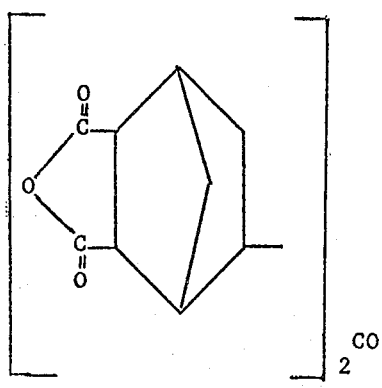

wherein R is selected from the group consisting of hydrogen and an alkyl group. Examples of compounds having such formulae include 5-bicyclo-(2.2.1)-heptane-2,3-dicarboxylic acid ketone; 5-bicyclo-(2.2.1)-heptane-2,3-dicarboxylic anhydride ketone; or 5-dialkyl bicyclo-(2.2.1)-heptane-2,3-dicarboxylate ketone, preferably having from 1 to about 5 carbon atoms per alkyl group, for example, 5-diethyl bicyclo-(2.2.1)-heptane-2,3-dicarboxylate ketone.

The tetracarboxylic bicycloheptane ketones having the above Formula I may be prepared, in general, according to the method of this invention by hydrocarboxylating a dicarboxylic bicycloheptene compound with carbon monoxide in the presence of a catalyst and water. The tetracarboxylic bicycloheptane ketone represented by Formula II above may, in general, be prepared according to the method of this invention by dehydrating the tetraacid represented by Formula I above where R is hydrogen.

When preparing the tetraacid compound represented by Formula I where R is hydrogen, the dicarboxylic bicycloheptene reactant used in the hydrocarboxylation reaction comprises either bicyclo-(2.2.1)-5-heptene-2,3-dicarboxylic acid or the anhydride thereof. When preparing the tetraester compound represented by Formula I where R is an alkyl group, the dicarboxylic bicycloheptene reactant used in the hydrocarboxylation reaction comprises a dialkyl bicyclo-(2.2.1)-5-heptene-2,3-dicarboxylic acid ester which preferably is an ester having from 1 to about 5 carbon atoms per alkyl group. Alternatively, the dicarboxylic bicycloheptene reactant used in the tetraester formation may comprise either bicyclo-(2.2.1)-5-heptene-2,3-dicarboxylic acid or the anhydride thereof when the hydrocarboxylation reaction is effected in the presence of an alcohol reactant, for example an alcohol containing from 1 to about 5 carbon atoms per molecule. As an alternative procedure for preparing the tetraacid, the tetraester may be prepared first and then converted to the tetraacid by saponification.

The hydrocarboxylation with carbon monoxide to prepare the tetraester or tetraacid represented by Formula I above may be conducted either in the presence of free carbon monoxide or in the presence of a material supplying the carbon monoxide reactant in situ. The latter procedure is the preferred method of this invention and is effected by conducting the reaction in the presence of a material such as a metal carbonyl, for example nickel or cobalt carbonyl, which generates the carbon monoxide reactant in situ. This method is particularly advantageous in that the high carbon monoxide pressure required when using free carbon monoxide is avoided. The quantity of the metal carbonyl used in the reaction is not critical and may be widely varied. Generally, however, it is advantageous to use an excess above the stoichiometric level of one-half mol of carbonyl per four mols of the bicycloheptene reactant and preferably within the range of 1 mol of the carbonyl per 2 to 8 mols of the bicycloheptene reactant. The catalyst used in the hydrocarboxylation reaction may be any of the well known catalysts used in carboxylation reactions including, for example, metallic nickel or cobalt, particularly in combination with acids such as acetic acid. A particularly advantageous catalyst system for the hydrocarboxylation reaction of this invention when using a metal carbonyl such as nickel carbonyl is to have actic acid present in the system to act in catalytic association with the metallic portion of the carbonyl. The quantity of catalyst used may be widely varied and when the catalyst comprises the metal carbonyl in association with an acid such as acetic acid, a quantity of such acid approximately equal in weight to the weight of the metal carbonyl is usually satisfactory under most circumstances.

The conditions used in effecting the hydrocarboxylation may be varied but, due to the highly exothermic nature of the reaction, it is preferred to conduct the reaction at a low temperature within the range of from about 0° to 75° C. and, more preferably, from about 40° to 60° C. and particularly at the refluxing temperature of the reaction mixture at atmospheric pressure. The duration of the reaction is not important and is dependent upon such variable factors as the temperature and the degree of mixing, but usually a period ranging from about ½ to 10 hours is satisfactory for most reactions. The quantity of water used is not critical but it should, at least, range from about 1.1 to 2 mols of water per mol of the bicycloheptene reactant. A solvent is advantageously used in the hydrocarboxylation and solvents suitable for such purpose include such materials as the dimethyl ether of ethylene glycol, the dimethyl ether of diethylene glyocl, tetrahydrofuran, dioxane or alcohols such as ethyl alcohol. When preparing the tetraacid, the solvent should preferably be non-alcoholic so as to prevent the formation of ester by-products. Alcohols may be used, however, without substantial ester formation if the quantity of water present is in substantial excess above the alcohol.

In the less preferred method of hydrocarboxylation where free carbon monoxide is used, the reaction is effected at superatmospheric carbon monoxide pressure generally ranging from about 2500 to 6000 pounds per square inch, and elevated temperature generally ranging from about 250° to 350° C. The carbon monoxide is preferably used in slight excess with a ratio of about 0.5 to 2 mols of carbon monoxide per mol of the bicycloheptene reactant being suitable under most circumstances. The catalyst used in this method may be either nickel, cobalt or the corresponding carbonyls. The quantity of catalyst used may be widely varied but usually a quantity ranging from about 0.05 to 30 weight percent of the reaction mixture is sufficient. The reactants described above for the preferred hydrocarboxylation method effected in the presence of a metal carbonyl may similarly be used in this method.

The dianhydride ketone represented by Formula II above, as indicated, may be prepared by dehydrating the tetraacid or tetraester represented by Formula I above. The dehydration may be effected according to any of the well known dehydration procedures such as thermal dehydration or treatment with phosphorus oxychloride, thionyl chloride, phosphorus pentoxide or acetic anhydride. Preferably, the dianhydride ketone is prepared using the tetraacid as the reactant and advantageously such preparation is effected using acetic anhydride. For example, the tetraacid can be reacted with an excess of acetic anhydride at the refluxing temperature of the mixture for a period sufficient to complete the reaction. After removing the excess acetic anhydride and acetic acid formed during the reaction from the reaction mixture, the mixture may be admixed with water and the desired dianhydride ketone thereafter recovered.

The preparation of the compounds represented by Formulae I and II above may be achieved in a batch-, semi-continuous or continuous-type process. For example, in a batch-type process using a material to supply the carbon monoxide reactant in situ, an appropriate quantity of a metal carbonyl, for example nickel carbonyl, an acid such as acetic acid, water and a solvent are charged together with the desired dicarboxylic bicycloheptene reactant under an inert atmosphere such as nitrogen to a reaction vessel having mixing, heating and cooling means. Extreme caution should be used in conducting the reaction because of the highly poisonous nature of the metal carbonyl. Due to the exothermic nature of the reaction the temperature should be gradually raised with mixing to the desired range which, under atmospheric pressure, usually ranges from about 40° to 60° C. The temperature of the mixture is then maintained for a period sufficient to complete the reaction. The desired ketone products are then isolated and purified according to conventional techniques including, for example, extraction, distillation and crystallization. When the dianhydride ketone product represented by Formula II above is desired, preferably a tetraacid prepared as above is charged to a vessel containing excess acetic anhydride. The mixture is then stirred and heated to refluxing temperature and maintained thereat until the reaction is complete. After removing acetic anhydride and acetic acid from the reaction mixture by distillation, the remaining mixture is mixed with water at a low temperature. The resulting dianhydride ketone product is then isolated and purified by conventional techniques including distillation, filtration and crystallization.

The following examples are cited to illustrate the novel class of compounds of this invention and the method of preparation therefor, but they are not intended to limit the broad nature of the invention to the specific products and procedures recited therein:

Example I 5-bicyclo-(2.2.1)-heptane-2,3-dicarboxylic acid ketone may be prepared as follows:

To a reaction flask equipped with heating/cooling and mixing means and means for maintaining an atmosphere of nitrogen therein are charged 238 grams (1.0 mol) of diethyl bicyclo (2.2.1)-5-heptene-2,3-dicarboxylate, 20 grams of water, 30 grams of acetic acid, 450 grams of tetrahydrofuran and 51.2 grams (0.3 mol) of nickel carbonyl. With mixing the solution is heated to about 45° C. and after a short period the reaction becomes exothermic. The temperature of the mixture is then maintained at about 45° C. for about six hours. The mixture is then cooled to about 25° C. and an aqueous sulfuric acid solution is added and the resulting mixture extracted with toluene. The toluene extract is washed with a sodium chloride solution and then distilled to remove the solvent. The residue is redissolved by refluxing with an aqueous sodium hydroxide solution (90 grams in 900 milliliters of water) thereby forming the salt of the tetraacid. Toluene is added and the mixture is then allowed to separate into aqueous and organic layers. The aqueous layer is separated and acidified with hydrochloric acid at about 0° C. The resulting ketone is then recovered from the mixture.

Example II

5 - diethyl - bicyclo - (2.2.1)-heptane-2,3-dicarboxylate ketone is prepared as follows:

To a reaction flask equipped with heating/cooling and mixing means and means for maintaining an atmosphere of nitrogen therein are charged 238 grams (1.0 mol) of diethyl bicyclo (2.2.1) - 5 - heptene-2,3 - dicarboxylate, 30 grams of acetic acid, 20 grams of water, 375 grams of ethanol and 51.2 grams (0.3 mol) of nickel carbonyl. With mixing the solution is heated to about 45° C. and after a short period the reaction becomes exothermic. The temperature of the mixture is then maintained at about 45° C. for about six hours. The mixture is then cooled to about 25° C. and an aqueous sulfuric acid solution is added and the resulting mixture is then extracted with toluene. The toluene extract is washed with a sodium chloride solution and then distilled to remove all water. The residue is redissolved in toluene and the mixture washed first with a saturated sodium bicarbonate solution. The washed mixture is then dried by contacting with sodium sulfide and after removal of the sulfate by filtration, the toluene is removed by distillation. By vacum distillation, the by-product, the triethyl ester of bicyclo (2.2.1)-heptane-2,3,5-tricarboxylic acid is removed as a volatile liquid. The tetraester ketone is then recovered from the residue.

Example III

5 - bicyclo - (2.2.1)-heptane-2,3-dicarboxylic anhydride ketone is prepared as follows:

To a reaction flask equipped with heating/cooling and mixing means containing 204 grams (2.0 mols) of acetic anhydride are charged 98.5 grams (0.25 mol) of 5-bicyclo-(2.2.1)-heptane-2,3-dicarboxylic acid ketone. With stirring, the mixture is heated to reflux temperature and maintained thereat for a period of four hours. After the excess acetic anhydride and acetic acid formed during the reaction are removed from the reaction mixture by distillation, the remaining mixture is slowly charged to a mixture of ice and water and the resulting mixture is stirred for a few minutes. The resulting product crystals are then separated and washed with water to recover the desired ketone product.

I claim as my invention:
1. A polycarboxylic ketone having the formulae

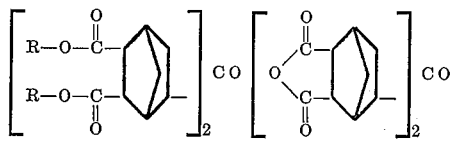

wherein R is selected from the group consisting of hydrogen and a hydrocarbon lower alkyl group.

2. A compound as defined in claim 1 further characterized in that said polycarboxylic ketone is 5-bicyclo-(2.2.1)-heptane-2,3-dicarboxylic acid ketone.

3. A compound as defined in claim 1 further characterized in that said polycarboxylic ketone is 5-bicyclo-(2.2.1)-heptane-2,3-dicarboxylic anhydride ketone.

4. A compound as defined in claim 1 further characterized in that said polycarboxylic ketone is 5-di-lower-bicyclo-(2.2.1)-heptane-2,3-dicarboxylate ketone.

5. A compound as defined in claim 1 further characterized in that said polycarboxylic ketone is 5-diethyl bicyclo-(2.2.1)-heptane-2,3-dicarboxylate ketone.

6. A method for preparing a polycarboxylic ketone having the general formula

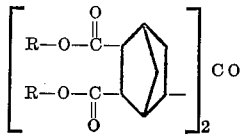

wherein R is selected from the group consisting of hydrogen and a hydrocarbon lower alkyl group which comprises reacting carbon monoxide in the presence of water and a catalyst selected from the group consisting of nickel carbonyl and cobalt carbonyl at a temperature of from about 0° C. to about 75° C. with a reactant selected from the group consisting of bicyclo-(2.2.1)-5-heptene-2,3-dicarboxylic acid, the anhydride of said acid and a lower alkyl diester of said acid and thereafter recovering the desired ketone.

7. The method according to claim 6 wherein said catalyst is nickel carbonyl.

8. A method for preparing a polycarboxylic ketone having the general formula

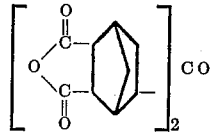

which comprises dehydrating 5-bicyclo-(2.2.1)-heptane-2,3-dicarboxylic acid ketone with a dehydrating agent selected from the group consisting of phosphorous oxychloride, thionyl chloride, phosphorus pentoxide and acetic anhydride, and thereafter recovering the desired ketone.

9. The method according to claim 8 wherein the dehydrating agent is dehydrated with acetic anhydride and the dehydration is effected at reflux temperature.

No references cited.

NICHOLAS S. RIZZO, *Primary Examiner.*